Patented Dec. 8, 1925.

1,565,185

UNITED STATES PATENT OFFICE.

JOHN L. MITCHELL, OF NEW YORK, N. Y.

LITHOPONE PRODUCT AND PROCESS OF MAKING THE SAME.

No Drawing.   Application filed October 6, 1922.   Serial No. 592,869.

*To all whom it may concern:*

Be it known that I, JOHN L. MITCHELL, a citizen of the United States, and a resident of the city of New York, borough of Manhattan, in the county and State of New York, have invented a new and Improved Lithopone Product and Process of Making the Same, of which the following is a full, clear, and exact description.

Lithopone ($BaSO_4 + ZnS$) as at present manufactured, is an excellent pigment for use in paints for interior use, but, notwithstanding all the improvements made in it, its use as a paint pigment for exterior surfaces has not met with any material success, owing to the fact that the zinc sulphide content becomes oxidized, by the action of the elements, into zinc sulphate, as per the equation—

$$BaSO_4 + ZnS + O_4 = BaSO_4 + ZnSO_4.$$

This chemical reaction is hastened in a moist atmosphere. This zinc sulphate, being one of the water soluble sulphates, dissolves in the moisture of the atmosphere, washes away from the surface to which it has been applied, and causes the paint to perish prematurely.

In the manufacture of lithopone, watery solutions of barium sulphide and zinc sulphate are brought together, chemical action taking place; the atoms of the molecules change their respective positions, the barium sulphide becoming barium sulphate and the zinc sulphate changing to zinc sulphide. This compound, being insoluble in water, precipitates to the bottom of the container and is called "lithopone", having the formula $BaSO_4 + ZnS$. At this stage of its manufacture, lithopone is practically of no commercial value as a paint pigment because it is at this stage deficient in density. However, after this precipitate is washed, ground, dried, calcined at a high temperature and quenched in cold water, its physical structure changes, owing to the sudden quenching in the cold water; and after it is filtered and dried it becomes a pigment of great density and of recognized value in the arts, although its use heretofore has been restricted to interior work owing to the chemical change brought about by the elements, as above mentioned.

The object of the present invention is to produce a lithopone product so formed as to eliminate entirely the oxidation of the zinc sulphide content of the lithopone and, at the same time, increase the density of the finished product so that a superior lithopone product is obtained which can be used for all the purposes to which it is at present applied and which, furthermore, can be used as a permanent white pigment for use in exterior as well as interior paints.

To attain this object, I change the method of manufacture ordinarily employed in making lithopones, by substituting a cold water solution of an agent such as barium sulphide, for the cold water, in which the pigment is quenched, and which solution is preferably kept constantly agitated during the quenching of the lithopone. The quenching of the hot lithopone in the cold barium sulphide solution has the effect of changing the physical structure of the lithopone and, in addition, the lithopone becomes saturated with barium sulphide solution.

After saturation and quenching is complete, the whole mass is pumped to a filter press, pressed to separate the free liquor from the solid matter, whereupon the surplus liquid is cooled and returned to the quenching tank to be used over again. In the meantime, the resultant paste or cake is taken from the filter press and conveyed, by any suitable means, such as a spiral conveyor, to the charging chamber of the muffle furnace, described in my Letters Patent No. 1,478,347 issued Dec. 18, 1923, entitled "Apparatus for the manufacture of lithopone", where it is simultaneously agitated and recalcined. During this calcination, the remainder of the moisture contained in the pigment is vaporized and the unstable barium sulphide is changed into the stable barium sulphate which envelops each particle of the pigment. A valve in the apparatus is then opened which allows the excess steam to escape, and when the pigment is thoroughly dry, the discharging means is operated and the pigment is expelled into a dry cooling chamber without quenching, from whence it is taken to be dry ground and gotten ready for the market.

Lithopone thus made has a much greater density than formerly, owing to the higher specific gravity and the greater refractive index of the product given to it by the addition of this stable envelope, and because each particle is enveloped by an enveloping agent, such as barium sulphate, the permanency of this product as a pigment is thereby insured.

In other words, the invention can be contemplated as including a step in any process of making lithopone, the step of quenching the lithopone, not in cold water but in a cold solution of an agent which will permeate and envelop the lithopone and which by heating and drying becomes stable, due to oxidation, whereby a protective coating around the lithopone is produced, a coating which not only prevents atmospheric conditions from affecting the zinc sulphide but also adds to the specific gravity and the density of the product.

What I claim is:—

1. The process of manufacturing a lithopone product which comprises quenching the lithopone, in the absence of air, in a solution of a soluble salt to form a protecting coating on each particle of the lithopone, and then changing the salt forming the coating into an insoluble one.

2. The process of manufacturing a lithopone which includes quenching the lithopone, in the absence of air, in the solution of a soluble barium salt to form a coating, and then changing the salt into an insoluble barium coat forming salt.

3. The process of manufacturing a lithopone product which includes quenching the lithopone in a solution of a soluble alkaline earth salt to form a coating and then changing this alkaline earth salt into an insoluble one.

4. The process of manufacturing a lithopone product which includes quenching the lithopone in a solution of an unstable barium salt to form a coating and then oxidizing said salt to form a stable coating around each particle of the lithopone.

5. The process of manufacturing a lithopone product which includes quenching the lithopone in a solution of barium sulphide, to form a coating of barium sulphide on the lithopone then oxidizing the barium sulphide coating to form a coating of barium sulphate on each particle of the lithopone.

6. A lithopone product including a coating of barium sulphate surrounding each particle of the lithopone.

7. A lithopone product, each particle of which being covered with a coating resulting from oxidizing thereon the dried residue of a soluble barium salt.

8. A lithopone product including a soluble barium salt impregnating said lithopone and oxidized to form a coating of an insoluble salt in protective relation with the lithopone.

JOHN L. MITCHELL.